United States Patent
Weech et al.

(10) Patent No.: US 7,408,784 B2
(45) Date of Patent: Aug. 5, 2008

(54) COMPUTER CHASSIS ASSEMBLY

(75) Inventors: Jonathan C. Weech, Star, ID (US); Martin B. Albini, Bozeman, MT (US)

(73) Assignee: Dedicated Devices, Inc., Boise, ID (US)

( * ) Notice: Subject to any disclaimer, the term of this patent is extended or adjusted under 35 U.S.C. 154(b) by 167 days.

(21) Appl. No.: 11/267,766

(22) Filed: Nov. 4, 2005

(65) Prior Publication Data
US 2007/0103857 A1 May 10, 2007

(51) Int. Cl.
*H05K 5/00* (2006.01)
(52) U.S. Cl. .................. 361/724; 248/220.21; 235/379; 312/223.2
(58) Field of Classification Search ............ 312/334.46, 312/223.2; 435/297.2, 303.1, 289.1; 206/320, 206/232, 472; 235/379, 381; 439/133, 304; 361/679–687, 724–727; 248/220.21, 309.1
See application file for complete search history.

(56) References Cited

U.S. PATENT DOCUMENTS

| | | | | |
|---|---|---|---|---|
| 5,689,400 | A | * | 11/1997 | Ohgami et al. ............... 361/683 |
| 6,157,545 | A | * | 12/2000 | Janninck et al. ............. 361/814 |
| 6,373,693 | B1 | * | 4/2002 | Seto et al. ................... 361/685 |
| 2002/0085347 | A1 | * | 7/2002 | Erickson et al. ............. 361/685 |
| 2005/0286235 | A1 | * | 12/2005 | Randall et al. .............. 361/724 |

* cited by examiner

*Primary Examiner*—Hung V Duong
(74) *Attorney, Agent, or Firm*—John R. Thompson; Stoel Rives LLP (57) ABSTRACT

A computer chassis assembly having a base with a plurality of connectors and guides is adapted to snap into and out of a universal mounting bracket. The chassis assembly further includes a midsection adapted to house a plurality of computer subcomponents which are removable without tools, the midsection being snapably removable from the base. The chassis assembly also includes a cover that is snapably removable from the midsection, which when removed, allows repair access to computer hardware subcomponents housed within the midsection.

34 Claims, 10 Drawing Sheets

COMPUTER CHASSIS ASSEMBLY

TECHNICAL FIELD

The present disclosure relates to the field of computer chassis, and more particularly, to the field of computer chassis having snapable pieces for tool-free assembly and disassembly.

BRIEF DESCRIPTION OF THE DRAWINGS

Understanding that these drawings depict only typical embodiments of the disclosure and are not therefore to be considered as limitations of its scope, the disclosure will be described and explained with additional specificity and detail through the use of the accompanying drawings in which:

FIG. 10 is a perspective view of a universal mounting bracket and intended plate that a computer chassis assembly may be mounted on.

DETAILED DESCRIPTION OF PREFERRED EMBODIMENTS

The embodiments of the present disclosure will be best understood by reference to the drawings, wherein like parts are designated by like numerals throughout. It will be readily understood that the components of a computer chassis assembly, as generally described and illustrated in the Figures herein, could be arranged and designed in a wide variety of different configurations. Thus, the following more detailed description of the embodiments of the apparatus and assembly, as represented in FIGS. 1 through 16, is not intended to limit the scope of the following claims but is merely representative of embodiments of the disclosure. Therefore, when the disclosure refers to "an embodiment," "one embodiment," or "another embodiment," it refers to at least one way in which to implement the disclosed assembly or device, and is by no means all inclusive.

Figure 1:
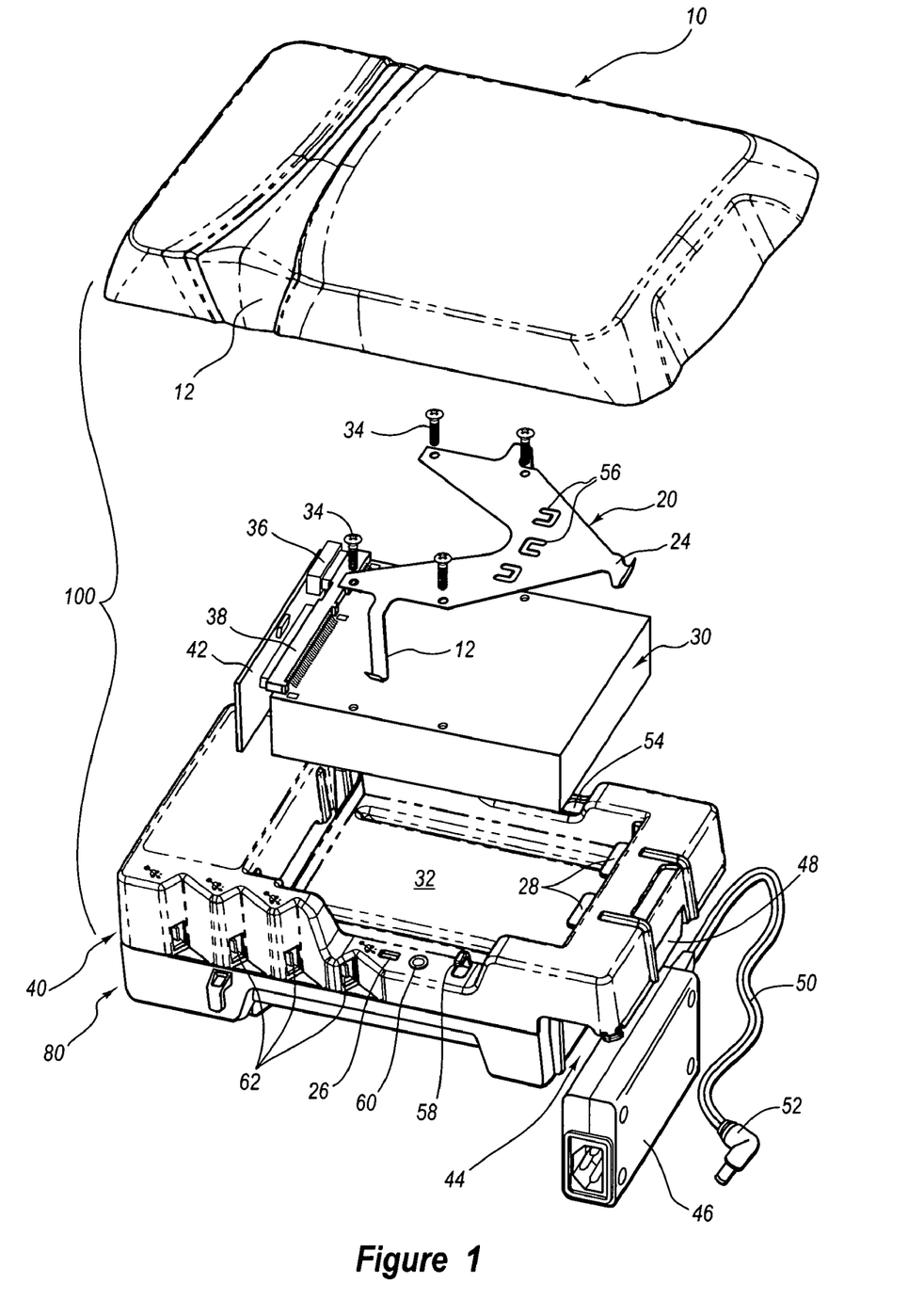
FIG. 1 is an exploded view of a computer chassis assembly, with a few subcomponents.

Referring to FIG. 1, an exploded view of a computer chassis 100 is shown, likewise displaying a few of the possible subcomponents therein. One skilled in the art will appreciate that chassis 100 can be built in different dimensions and for a variety of computer applications, with limitations confined only to the particular application, i.e. limited in size to fit a mounting bracket, shelf, or a computer cabinet. The subcombination shown in FIG. 1 is exemplary of an embodiment comprising a network router.

Referring to FIGS. 1 through 5, a computer chassis assembly 100 may include a cover 10, a hard drive securement plate 20, a midsection 40, and a base 80, all that may snapably connect to or disconnect from each other in the relationships shown. Securement plate 20 attaches to hard drive 30, one of many subcomponents that may be supported by chassis assembly 100. The combination of securement plate 20 and hard drive 30 may snapably connect into a space 32 defined in midsection 40. Midsection 40 may snapably connect onto a base 80. Finally, cover 10 may snapably connect over midsection 40 as an aesthetic finish and as a protection to computer chassis 100's subcomponents. These removably coupled parts make access to parts needing repair or replacement easy and inexpensive.

The ability to snapably connect refers to connecting parts which may be removably coupled without the use of tools. Such a connection includes a snap or tension fit whereby the material of each component couples to a connecting component in a configuration that obviates the use of tools. A clip and/or tension spring may be used whereby materials of abutting pieces are formed in counter-pressured relationships to each other. This relationship provides the force to keep connected pieces together while not being connected by threaded bolts or other means that may require tools for disassembly.

Referring again to FIG. 1, computer chassis 100 may include a cover 10, adapted with tension springs (not shown) for snapably connecting to the assembled midsection 40 and base 80. Window 12 of cover 10 may be formed of transparent plastic or other transparent material, providing means for light to escape from computer subcomponents, such as an LED on a motherboard or a circuit board, as an indication of proper computer functioning. Such indication may be as simple as the motherboard getting power, or as complicated as indicating that specific data connections are good and whether they are passing data.

Figure 2:
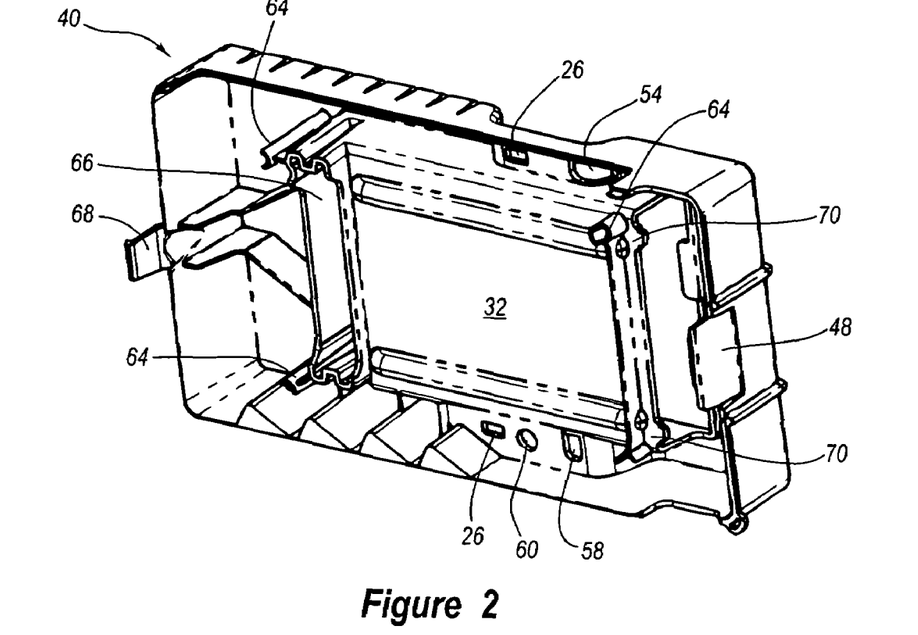
FIG. 2 is a perspective view of the inside surface of the midsection.

A hard drive plate 20 may be employed to secure a hard drive 30. Securement plate 20 may be made of sheet metal or any metal capable of acting as a heat sink. Hard drive securement plate 20 may include a plurality of tension springs 22 and 24 that may be used to connect hard drive 30 to midsection 40 as shown in FIG. 2. Tension springs 22, which are two in number as displayed, extend symmetrically and grip to opposing sides of hard drive 30. Tension spring 24 extends from the plate and grips to a third side of hard drive 30. Springs 22 and 24 extend generally perpendicular from securement plate 20, and springs 22 may extend further than spring 24. Springs 22 and 24 include a hook or clip to engage an aperture or lip of midsection 40. Springs 22 engage apertures 26 and spring 24 engages the lip edge of midsection 40 between lip protrusions 28, which act as guides to center hard drive 30 in space 32 formed by midsection 40.

Screws 34, or in the alternative, quick-snap connectors may be employed to attach securement plate 20 to hard drive 30 so that the connected whole may be removed at once, without tools, for repair or replacement of hard drive 30.

Tension springs 22 and 24 allow hard drive 30 to be located within space 32 for easy access for repair, and close proximity to other computer subcomponents, which can be located beneath or within connection distance to hard drive 30. Such connections include power connector 36 and data connector 38. Data connector 38 may be of IDE or PCMCIA standards, or other connections known or developed in the art. Space 32 may also be defined expansive enough to locate other subcomponents.

Midsection 40 and base 80 may further define hollow region 44 at one end to receive D.C. power supply 46 in a snap-fit configuration. To provide for a snapable connection, tension spring 48 protrudes back toward midsection 40 and pushes against power supply 46 when snapped into place. Power cable 50 with end connector 52 may also be fed through aperture 54, located on one side of midsection 40. Power cable 50 may then, to rein in excess length, be threaded through clips 56 in securement plate 20 and then through finger 58 on an opposite side of midsection 40. Finally, end connector 52 may just reach power connection 60 as displayed in FIG. 3.

Figure 3:
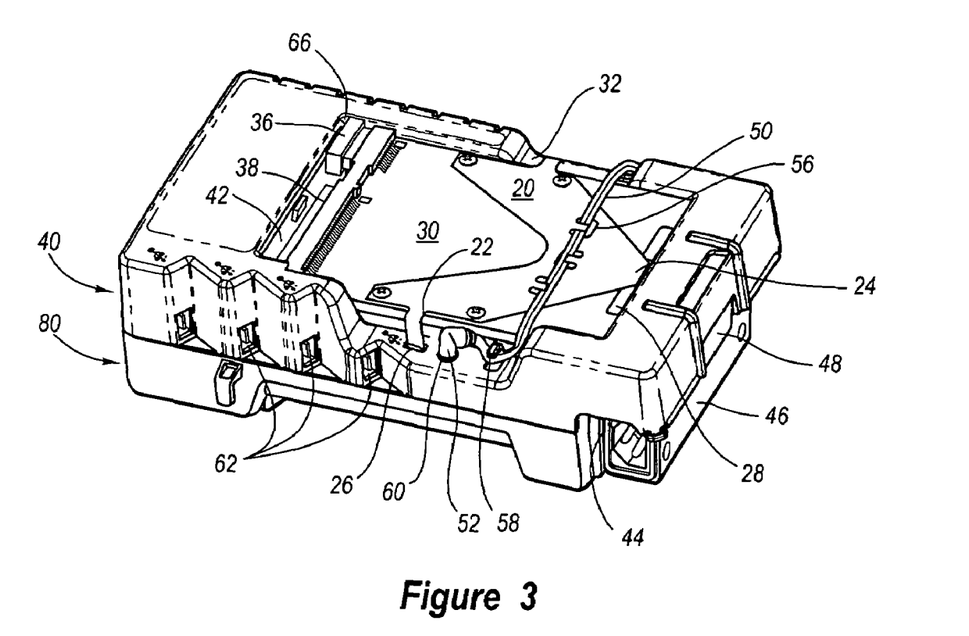
FIG. 3 is a perspective view of an assembled computer chassis with the cover removed.

With the location of power connection 60, a motherboard may be located sufficiently close to the underside of hard drive 30 to reach the hardware required for power connection 60 near to the edge of midsection 40. Feeding power cable 50 over hard drive 30 further has the effect of requiring disconnection of power from the motherboard before removing hard drive 30 and accessing any of the computer's electrical hardware. This will help prevent electrical damage through accidental shorts while repairing computer hardware.

An embodiment also includes a plurality of USB ports 62, which may be located in midsection 40 of computer chassis assembly 100. USB ports 62 may be recessed at an angle less than ninety degrees to midsection 40's surface, providing a built-in securing device for preventing damage or breakage of USB cable ends. One embodiment of a network router is to connect the USB ports to a circuit board or an expansion card.

Referring to FIG. 2, displayed is a perspective view of the bottom of midsection 40. Protrusions 64 may be located at the fringes or corners of space 32 to provide abutment to a subcomponent such as a motherboard, so that midsection 40 may provide sufficient additional space for other subcomponents. Protrusions 64 may also aid in proper spacing and fit in the snapable connection between midsection 40 and base 80.

Figure 4:
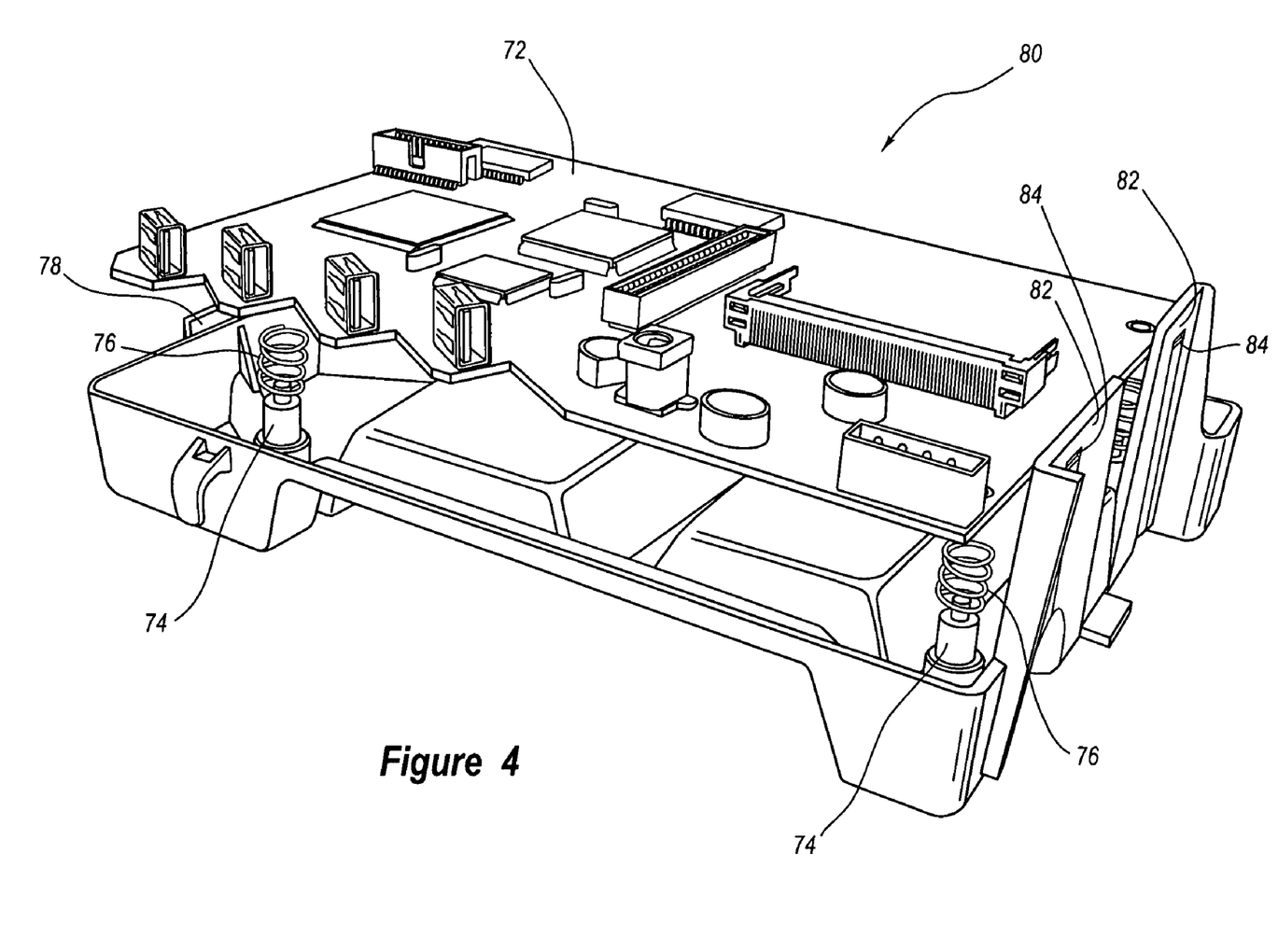
FIG. 4 is a perspective view of the base of a computer chassis, with a circuit board thereon.

Midsection 40 may further define hole 66 at either end of space 32 to provide a shunt path for power and data cables of hard drive 30 to connect to a motherboard located beneath it. Finally, tension spring 68 may be located opposite tension spring 48 to snap into a clip or protrusion located in base 80 (as seen in FIG. 4). As discussed, tension spring 68 may provide the counter-pressure required to have a firm fit while making it possible to disassemble by hand and without tools. Apertures 26 and 54, power connection 60, and finger 58 are shown extending through the bottom of midsection 40 and correspond to those features discussed with reference to FIG. 1. Finally, slit protrusions 70 may extend into small slits in uprights (not shown) of base 80 that form a wall between base 80 and hollow region 44. The uprights are shown in FIG. 4 and this snapable connection is further discussed later.

Referring to FIG. 3, displayed is a midsection 40 and a base 80, now assembled. Hard drive 30 may be located within space 32 in a snapable connection through use of tension springs 22 and 24. A tension spring 22 is shown having its clip ends providing counter-pressure from within aperture 26 and upward against the inside of midsection 40. Shorter tension spring 24 has likewise secured itself underneath midsection 40 in an area defined between lip sections 28, using a similar counter-pressure. The three tensions springs including 22 and 24 provide a very secure means of locating hard drive 30 within computer assembly 100 while still making it easy to remove by hand, without the use of tools.

Depending on the size of space 32, power connector 36 and data connector 38 may be very close to the sides of space 32. If it is desirable to have hard drive 30 closely confined within chassis assembly 100, then hole 66 defined adjacent space 32 will be valuable real estate for data and power cables to reach a circuit board located below hard drive 30. Space 66 may be further expanded to receive a circuit board expansion card 42, or other small computer subcomponents.

Power supply 46 is shown now snapped into place inside hollow region 44. Note that tension spring 48 may contact power supply 46 and push power supply 46 against the outer surfaces of midsection 40 and/or base 80. This snapable connection securely retains power supply within a chassis assembly 100 with the maximum use of space. Any excess power cable 50 may then be routed from its origin at power supply 46, through one side of midsection 40 and then through clips 56 of securement plate 20. Power cable 50 may ultimately be thread through finger 58 in an opposite side of midsection 40 for connection of power end 52 into power connection 60. This configuration has the further advantage of requiring the disconnection of power before removing hard drive 30 for repair or for accessing additional computer hardware located below hard drive 30 for repair or replacement. One embodiment of chassis assembly 100 includes a plurality of USB connections 62, as discussed with reference to FIG. 1.

Referring to FIG. 4, a base section 80 is displayed, showing one embodiment of locating a motherboard or circuit board 72 between base 80 and midsection 40. A plurality of pins 74 with springs 76 thereon are also shown extending from the inside to the outside of base 80. Pins 74 and springs 76 may protrude to the inside of base 80 until they come into abutting contact with a circuit board 72. Using springs 76 of the metal helical-type as well as manufacturing pins 74 of metal will enable electrical contact with circuit board 70, thus providing a ground path from circuit board 72 to a universal bracket or other mount to which to attach chassis assembly 100. Also, at least two pins 74 in diagonal relationship across base 80 may be required to provide sufficient stability, especially where springs 76 will provide means to dampen vibrations from hard drive 30 and other hardware.

Base section 80 may be shorter in height than midsection 40 and may be configured to snapably receive midsection 40. Protrusion or half-hoop 78 may be placed to receive tension spring 68, which is shown in FIG. 2. Uprights 82 of base 80 may extend up higher than the rest of base 80 to come into contact with midsection 40 along the back side of hollow region 44. Thus, uprights 82 may form a wall against which power supply 46 is pressed by tension spring 48. In the alternative, midsection 40 or a combination of midsection 40 and base 80 may provide this wall space defining hollow region 44.

Slits 84 may be formed in uprights 84 for reception of slit protrusions 70 referred to in FIG. 2, providing a convenient snapable connection wherein uprights 82 of base 80 act as long tension springs. The counter-pressured relationship provided between slit protrusions 70 and uprights 82 may provide the opposing snapable connection from that provided by tension spring 68 and half-hoop 78, together which makes the entire midsection 40/base 80 connection completely snapable.

Figure 5:
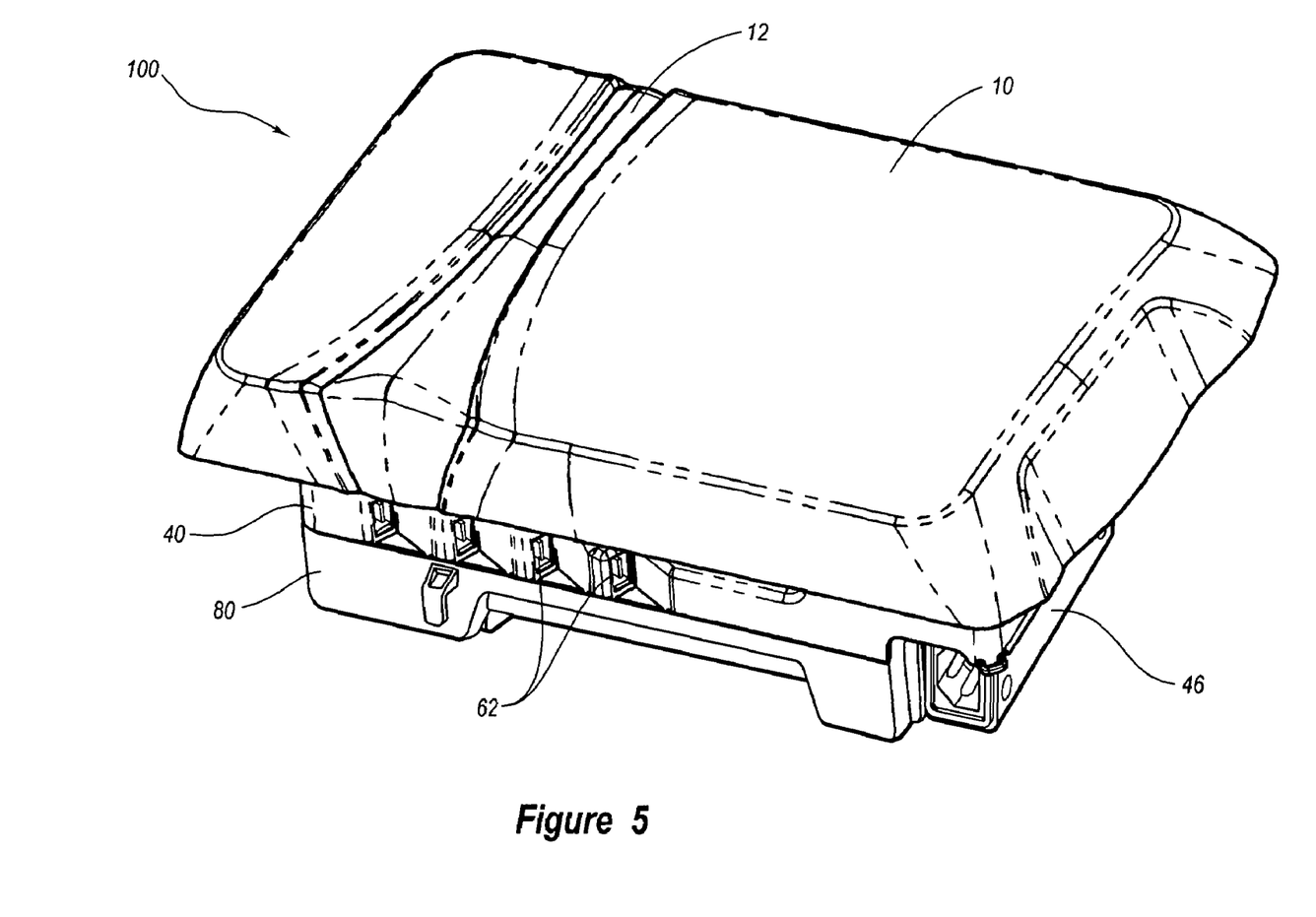
FIG. 5 is a perspective view of a computer chassis assembly, showing a cover in place over the top of the bottom two sections.

FIG. 5 shows a perspective view of computer chassis assembly 100 fully assembled, and capped with cover 10. As shown, cover 10 may extend over and protect midsection 40 and base 80 from dropping water, condensation, or from electrical wires or fields that may short out connections of chassis assembly 100. Translucent window 12 may be located so that an LED or other light from circuit board 70 or another subcomponent may shine through and indicate conductivity or continuity of operation. A plurality of USB ports 62 are visible, as is power supply 46, also shown in FIG. 1. FIG. 5 shows how compact an entire computer chassis assembly 100, such as a network router, can be when built without additional connectors such as bolts, screws, and/or nuts.

Figure 6:
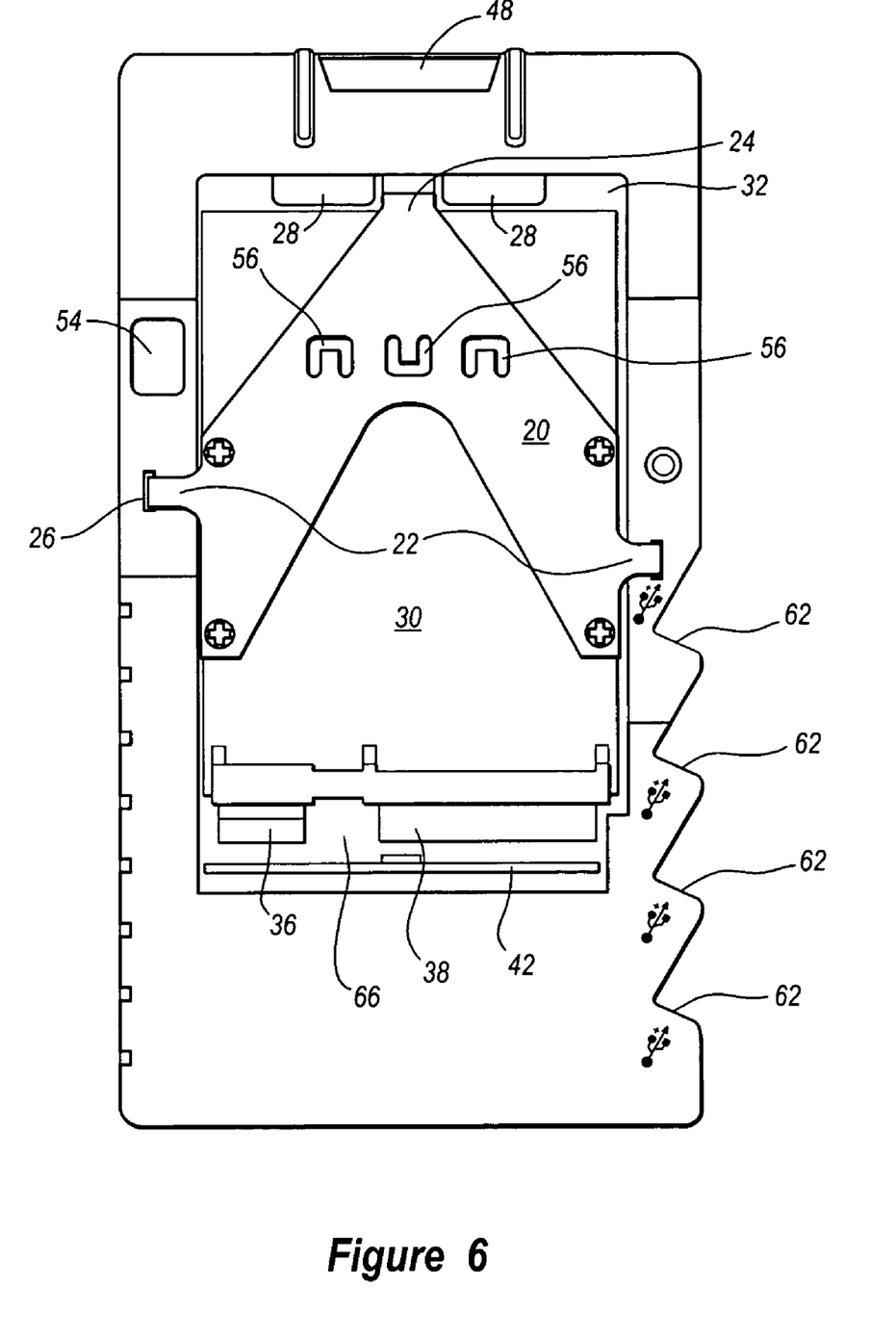
FIG. 6 is a plan view of the top of a midsection of a computer chassis assembly.

Referring to FIG. 6, a plan view of the top of a midsection 40 is displayed. This view of chassis assembly 100 shows the tightness with which subcomponents and cable connectors, such as power connector 36 and data connector 38, may be located when snapable connections are used. Securement plate 20, attached to hard drive 30, is located within space 32 with little room to spare. Other embodiments may be made with more room alongside hard drive 30 or in hole 66 for accommodations of other subcomponents, such as in this embodiment, a circuit board expansion card 42. Tensions springs 22 are snapped into place in apertures 26 located in opposing sides of midsection 40. Tension spring 28 on a third side of securement plate 20 is secured under the lip of midsection 40 and between lip protrusions 28. Lip protrusions 28 may also help minimize vibrations of hard drive 30.

Apertures 54 and 56, power connection 60, and tension spring 48 are also shown in FIG. 6, corresponding to FIGS. 1 through 3. A plurality of USB ports 62 are likewise displayed, showing that the amount of recess and angle with respect to midsection 40 (here forty-five degrees) is such as to prevent USB cable ends from being damaged. This protection is provided because USB cable ends will be largely precluded from lateral movement.

Figure 7:
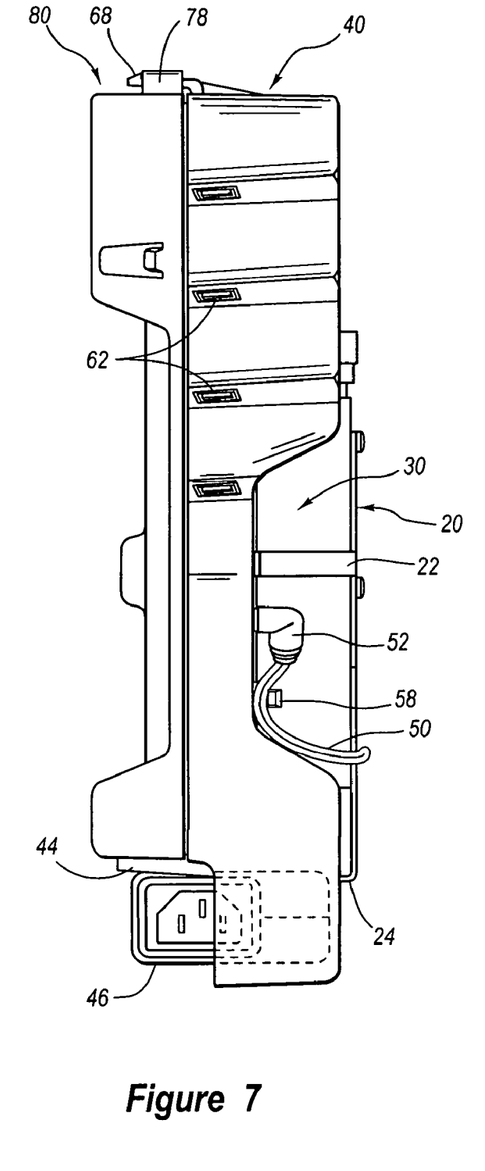
FIG. 7 is a perspective view of a side of a computer chassis assembly.

Referring to FIG. 7, displayed is one side of a chassis assembly 100, where are located a plurality of USB ports 62 for connection. USB ports 62 may be recessed into midsection at an angle, as discussed, to provide a secure connection that prevents breakage to USB cable ends. As shown, power supply cable 50 may be threaded over securement plate 22 and hard drive 30 and through finger 58. Power supply cable 50's end connector 52 may then be connected into a circuit board 72 (not shown) within midsection 40. Securement plate 20 is shown securing hard drive 30 with the use of tension springs 22 and 24, which snapably connect with counter-pressured configurations into midsection 40.

Figure 8:
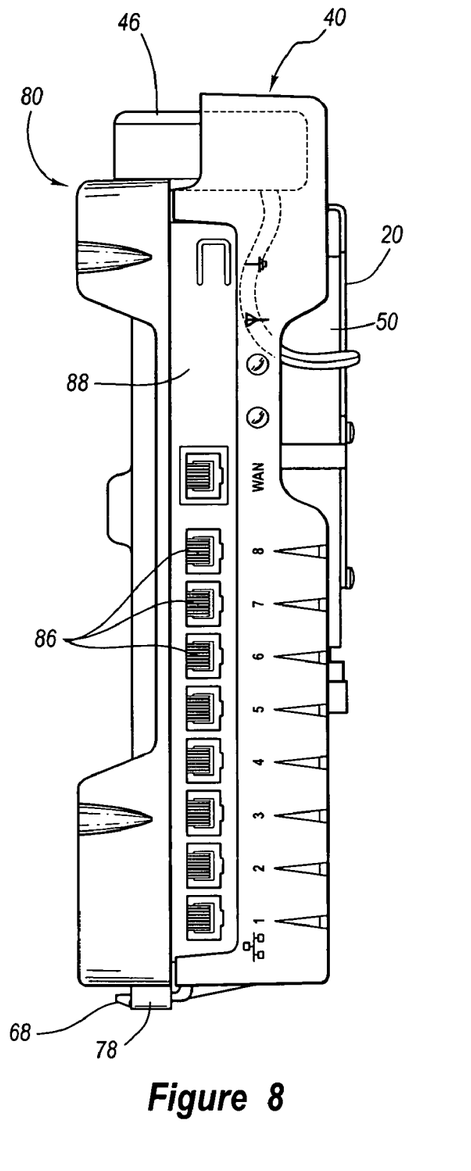
FIG. 8 is a perspective view of another side of a computer chassis assembly.

Also, FIGS. 7 and 8 show the discrepancy in height of a midsection 40 compared with base 80 in one embodiment. This is because midsection 40 has been designed to house the majority of the chassis assembly's hardware components in the embodiment displayed. Those skilled in the art will recognize that chassis assembly 100 could be designed in accordance with the spirit of this disclosure, where a base 80 houses the majority of hardware components.

Referring to FIG. 8, in one embodiment, the opposite side of the chassis assembly 100 may include a plurality of network ports 86, capable of accepting 10/100BASE-T or other categories of twisted pair Ethernet cabling known in the art, i.e. shielded (STP) and unshielded (UTP) twisted pair. One skilled in the art may adapt ports 86 to accept a number of additional network cabling standards, such as but not limited to: CAT-1 through CAT-6; RG-62 A/U coaxial; RG-6/11 coaxial; Twin-axial; Type 1; or Single-mode or Multimode fiber. Thus, ports 86 may be adapted to receive myriad of data connectors such as, but not limited to: RJ-45, RS-485, or RJ-11 for twisted pair; BNC for coax; or ST, FC, LC and SC style connectors (both single-mode and multimode) for fiber optic cables. One skilled in the art will appreciate that ports 86 may alternatively be adapted for a wireless network connection containing at least one antenna.

Gasket 88, which may be made of metal, might optionally be used as a cover over the space defined between network ports 86 and the space defined between network ports 86 and both midsection 40 and base 80. Gasket 88 may be easily insertable by providing a slit or slits in middle section 40 where gasket 88 comes into contact with it. Snapping middle section 40 onto base section 80 may then force gasket 88 into such slit(s), thus securing it from lateral movement. Such slit(s) may also be located in base 80 to provide secure attachment.

Referring to FIGS. 7 and 8, both show half-hoop 78 into which tension spring 68 may connect and disconnect without the use of tools. The curved end of spring 68 need only be pressed inward while midsection 40 and base 80 are pulled apart to disconnect that end of chassis assembly 100.

Referring to FIGS. 1 through 8, in an embodiment, a circuit board 72 and/or expansion boards such as 42 may be located adjacent USB ports 62, power connection 60, network ports 86, and a hard drive 30's power 36 and data 34 connections, such that all power and data run through a central control system. Data connection 34 may be of IDE or PCMCIA standards, or other connections known or developed in the art.

Figure 9:
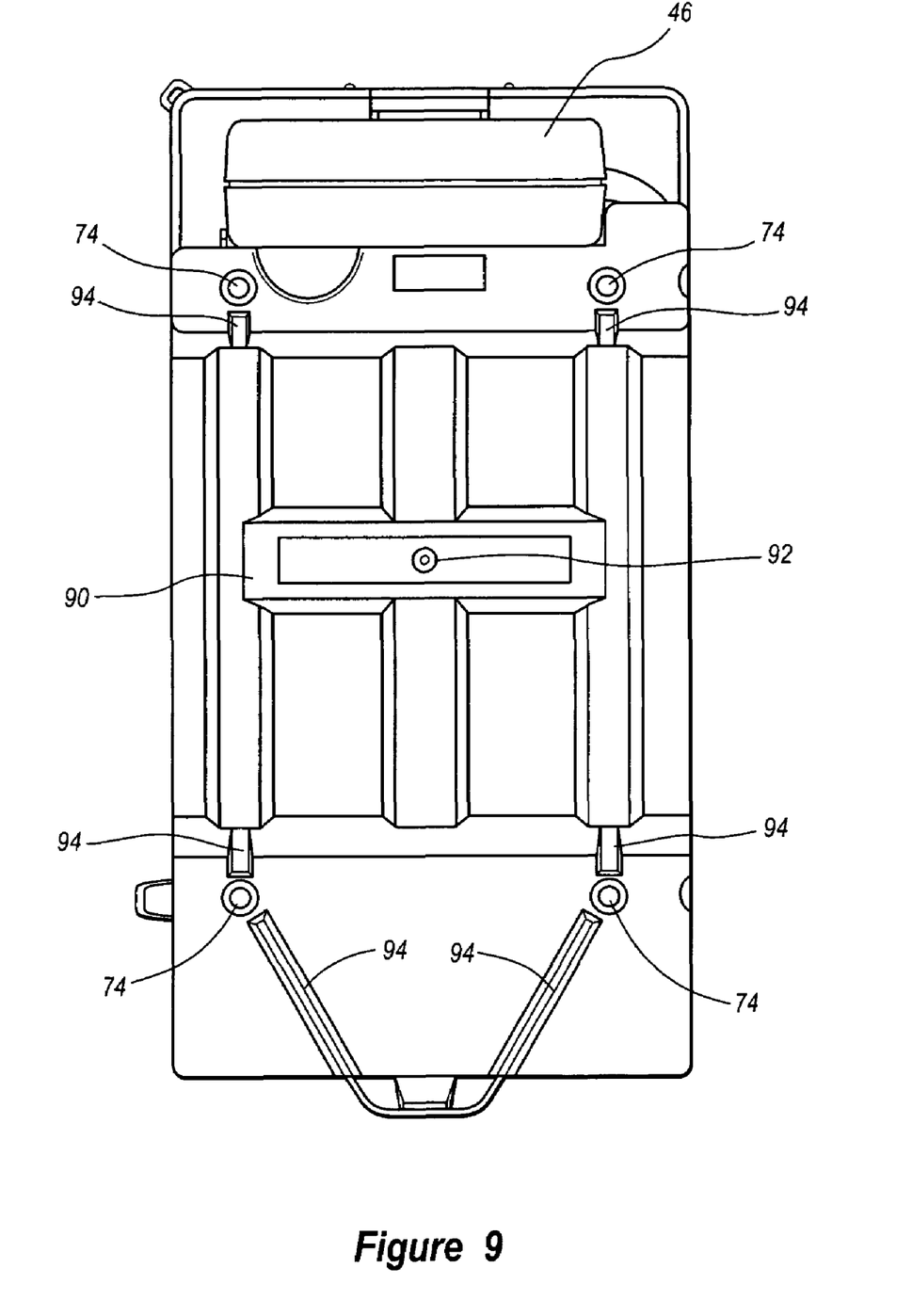
FIG. 9 is a plan view of the bottom of a base section of a computer chassis assembly.
Figure 10:
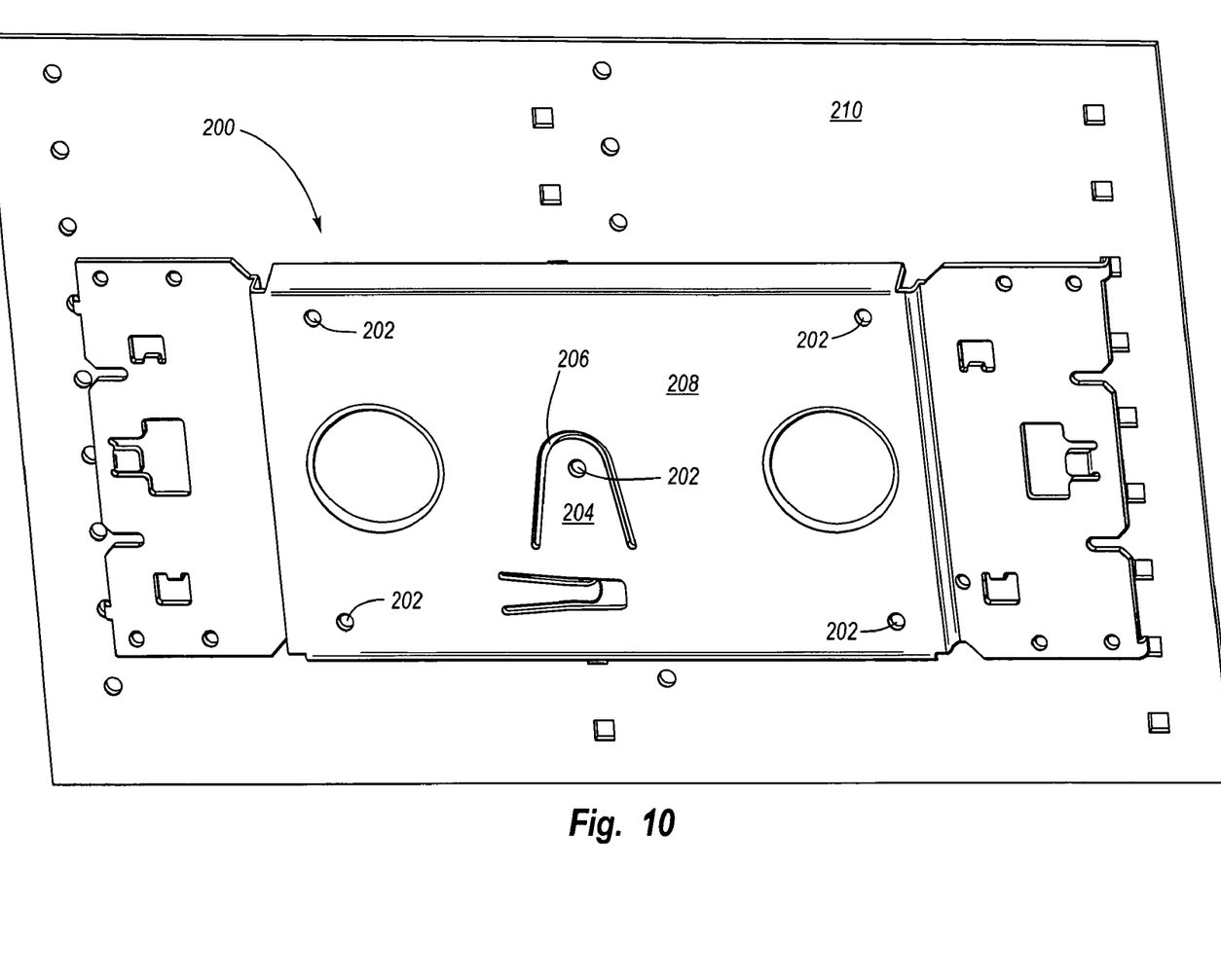
Figure 11:
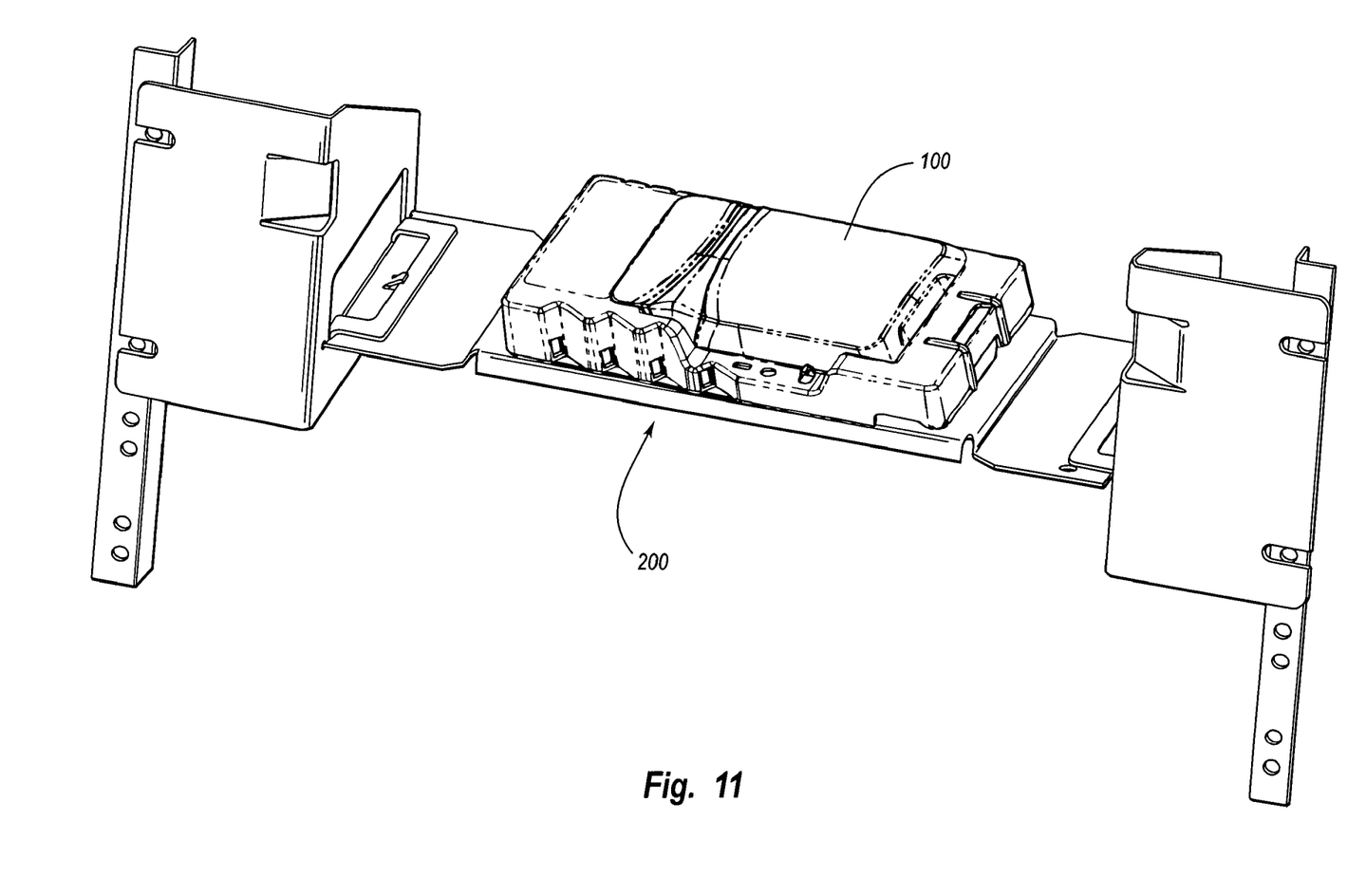
FIG. 11 is a perspective view of another embodiment of a mounting bracket, showing computer chassis assembly mounted thereon.

Referring to FIG. 9, base section 80 may be configured to be easily slid and snapped into place into a variety of mounting brackets. The several embodiments of a universal mounting bracket disclosed in U.S. patent application Ser. No. 11/056,526 are exemplary and the application is herein incorporated by reference. FIGS. 10 and 11, which are embodiments of that patent application, will be further referenced as related to the mounting of chassis assembly 100 onto a universal mounting bracket 200.

Pins 74 may be a plurality, but use of at least two pins located diagonally across base section 80 is sufficient to secure base 80 into a mounting bracket 200's apertures 202 of FIG. 10. An alignment spring 204 is defined by forming a channel 206 through the mounting face 208. Alignment spring 204 is biased inward, or in a direction toward an intended panel 210 for mounting bracket 200 to attach to. This biasing enables alignment spring 208 to couple extending member 90 of base 80 in order to guide lowest protrusion 92 into central mounting aperture 202. This coupling, in turn, guides pins 74 into mounting apertures 202. The biasing of alignment spring 204 also ensures pins 74 are securely held in place in mounting apertures 202, providing a firm connection as shown in FIG. 11.

Fasteners may be employed on top of pins 74 to ensure longevity of the connection, but are not required, especially for horizontally-oriented mounting brackets as shown in FIG. 11. Fasteners may further not be required because pins 74 may include circular channels onto which the edge of mounting face 208 within mounting apertures 202 may catch, holding pins 74 in place inside apertures 202.

In order to facilitate connection of protrusion 92 and pins 74 into apertures 202, protrusion 92 may be flush with pins 74 when base section 80 is placed on a flat surface. Likewise, gun sights or alignment grooves 94 may provide means for guiding pins 74 toward apertures 202, depending on the configuration of mounting bracket 200. Alignment grooves 94 aid a computer chassis assembly 100 to be adaptable to a plurality of universal mounting brackets having different configurations and may especially be useful in attaching chassis assembly 100 to a mounting bracket located in a difficult-to-access location. Such snapably-removable configurations of computer chassis assembly 100 make access, as well as assembly and disassembly, convenient for repair and parts replacement.

Figure 12:
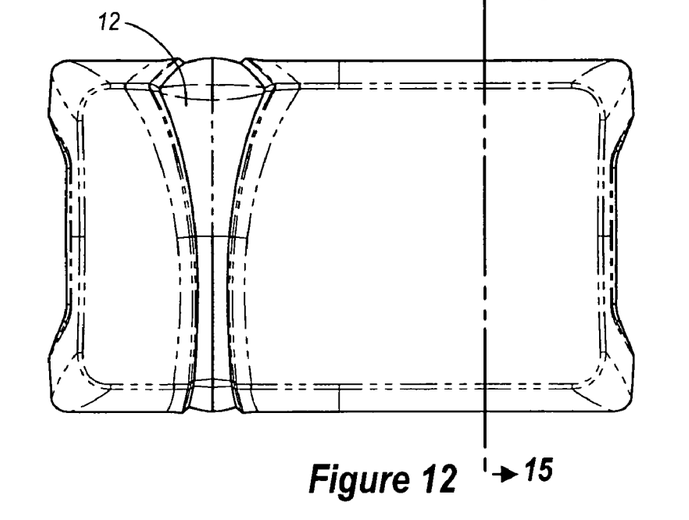
FIG. 12 is a plan view of a top surface of a cover of a computer chassis assembly.
Figure 13:
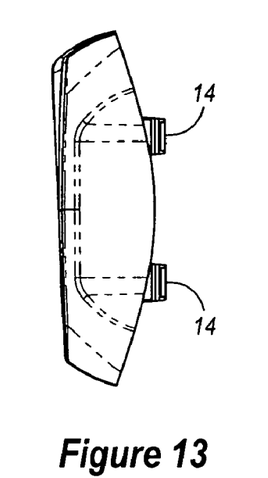
FIG. 13 is a cross-sectional view from one end of a cover of a computer chassis assembly.
Figure 14:
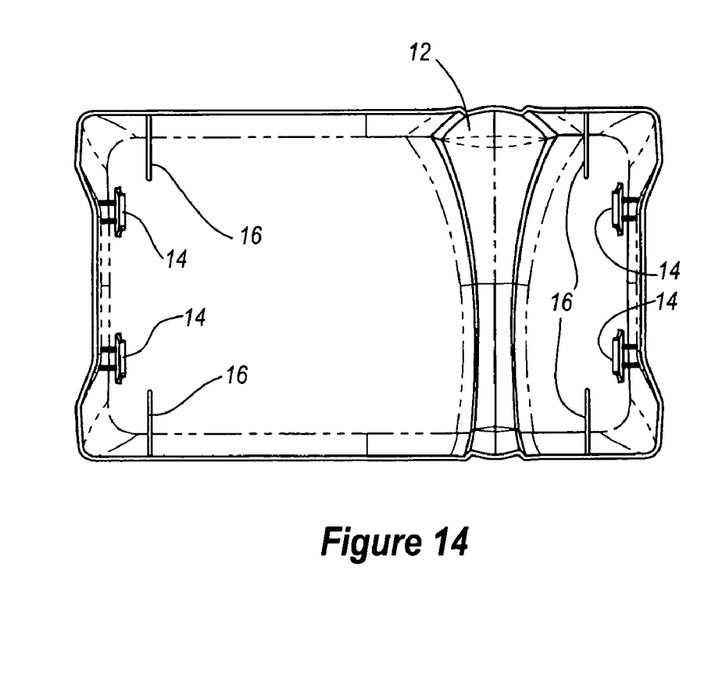
FIG. 14 is a perspective view of an inside surface of a cover of a computer chassis assembly.
Figure 15:
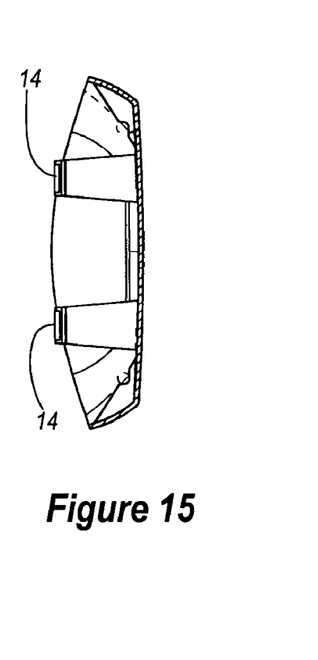
FIG. 15 is a cross-sectional view looking at the direction indicated in FIG. 12 at an end of a cover of a computer chassis assembly.

Referring to FIGS. 12 through 15, cover 10 provides both protection to the device or assembly's computer subcomponents, as well as easy access for repair or replacement of computer hardware. Tension springs 14 may include protrusions, which overlap the edge of middle section 40, thus securing cover 10 without making it difficult to remove by hand. Wings 16 may protrude from the inner side of cover 10, shown in FIG. 14, which aid the cover guide itself into the proper location for snapping onto middle section 40. Referring further to FIGS. 13 and 15, tension springs 14 clearly show lip protrusions at the end thereof. These protrusions aid tension springs, which are pressured inward, to grab and retain hold of the lower edge of midsection 40.

Referring finally to FIGS. 12 and 14, window 12 may be made of transparent plastic or another transparent material. The transparency of window 12 may allow light from an LED, a plurality of LEDs, or from another source of light to shine through. These LEDs may be located on a motherboard to indicate computer hardware is receiving power, or they may indicate that a plurality USB or Network ports, or similar data connections, are properly sending and/or receiving data.

It will be apparent to those having skill in the art that many changes may be made to the details of the above-described embodiments without departing from the underlying principles of the invention. The scope of the present invention should, therefore, be determined only by the following claims.

The invention claimed is:

1. A computer chassis assembly adapted to snap into and out of a universal mounting bracket having apertures, comprising:
    a base having a plurality of connectors for snapping into and out of the apertures;
    a midsection defining a space adapted to house a plurality of computer subcomponents, the subcomponents removable without tools and the midsection snapably removable from the base; and
    a cover that is snapably removable from the midsection, which when removed, allows repair access to a computer subcomponent housed within the midsection,
    wherein a computer subcomponent includes a hard drive and wherein removal of the cover allows repair access to the hard drive, and
    wherein the hard drive further includes a securement plate, the securement plate having a plurality of tension springs adapted to be snapably removable from the midsection.

2. The assembly of claim 1, wherein the midsection further comprises a plurality of ports for hardware and network interface connection.

3. The assembly of claim 2, wherein the network interface ports include a plurality of USB ports, which are recessed and oriented at an angle of generally about forty-five degrees, to prevent breakage of USB cable ends.

4. The assembly of claim 1, wherein the base comprises:
    an extending member to provide a stopping point along the mounting bracket, the extending member having a lowest protrusion; and
    at least two pins substantially level with the lowest protrusion, the pins and lowest protrusion adapted to snap into the apertures of the mounting bracket at the stopping point.

5. The assembly of claim 4, the base further comprising a plurality of alignment grooves for guiding the pins into the apertures.

6. The assembly of claim 4, wherein the at least two pins of the base further extend into the chassis and abut at least one computer subcomponent to provide a ground path from the at least one computer subcomponent to the mounting bracket.

7. The assembly of claim 6, wherein the computer subcomponent is a circuit board.

8. The assembly of claim 6, wherein between the inner portions of the pins and the computer subcomponent are located springs for protecting the computer subcomponents from vibration.

9. The assembly of claim 1, wherein a computer subcomponent includes a circuit board.

10. The assembly of claim 1, wherein a computer subcomponent includes a circuit board expander.

11. The assembly of claim 1, wherein a computer subcomponent includes a power supply.

12. A computer chassis assembly adapted to snap into and out of a universal mounting bracket having apertures, comprising:
    a base having a plurality of connectors for snapping into and out of the apertures;
    a midsection defining a space adapted to house a plurality of computer subcomponents, the subcomponents removable without tools and the midsection snapably removable from the base; and
    a cover that is snapably removable from the midsection, which when removed, allows repair access to a computer subcomponent housed within the midsection,
    wherein a computer subcomponent includes a power supply, and
    wherein the connected base and midsection further define a hollow region at one end, the hollow region configured to receive the power supply in a snapably-removable configuration.

13. The assembly of claim 12, wherein the power supply includes a power supply cable threaded from the power supply through the midsection so as to cover the hard drive before connecting into a power connection.

14. A computer chassis assembly adapted to snap into and out of a universal mounting bracket having apertures, comprising:
    a base having a plurality of connectors for snapping into and out of the apertures;
    a midsection defining a space adapted to house a plurality of computer subcomponents, the subcomponents removable without tools and the midsection snapably removable from the base; and
    a cover that is snapably removable from the midsection, which when removed, allows repair access to a computer subcomponent housed within the midsection,
    wherein the cover further includes a transparent window for viewing lights of the plurality of computer subcomponents, the lights being indications of proper power and data connection.

15. A computer chassis device configured for tool-free connection to and disconnection from a universal mounting bracket, comprising:
    a base having a plurality of protrusions snapably connectable to the mounting bracket;
    a midsection defining a space in the top thereof for reception of a hard drive, the midsection configured to contain a plurality of hardware components, at least one of which is snapably removable for easy repair, the midsection snapably removable from the base; and
    a cover snapably removable from the midsection, which when removed, supplies ready access to the hard drive,
    wherein the midsection includes a plurality of tension springs to allow the plurality of hardware components to be snapably reinserted after removal.

16. The device of claim 15, wherein the plurality of hardware components includes a circuit board having a plurality of USB and network ports, the circuit board located generally between the midsection and the base.

17. The device of claim 16, wherein the USB ports are located at less than a ninety-degree angle with respect to the middle portion.

18. The device of claim 15, wherein the midsection further defines a hole located proximate the space, the hole for housing at least one circuit board expansion card and a plurality of power and data cables.

19. The device of claim 15, wherein the plurality of hardware components includes a power supply.

20. A computer chassis device configured for tool-free connection to and disconnection from a universal mounting bracket, comprising:
   a base having a plurality of protrusions snapably connectable to the mounting bracket;
   a midsection defining a space in the top thereof for reception of a hard drive, the midsection configured to contain a plurality of hardware components, at least one of which is snapably removable for easy repair, the midsection snapably removable from the base; and
   a cover snapably removable from the midsection, which when removed, supplies ready access to the hard drive,
   wherein the plurality of hardware components includes a circuit board having a plurality of USB and network ports, the circuit board located generally between the midsection and the base, and
   wherein the plurality of protrusions includes at least two pins which extend from the mounting bracket to contact the circuit board, for providing a ground path.

21. A computer chassis device configured for tool-free connection to and disconnection from a universal mounting bracket, comprising:
   a base having a plurality of protrusions snapably connectable to the mounting bracket;
   a midsection defining a space in the top thereof for reception of a hard drive, the midsection configured to contain a plurality of hardware components, at least one of which is snapably removable for easy repair, the midsection snapably removable from the base; and
   a cover snapably removable from the midsection, which when removed, supplies ready access to the hard drive,
   wherein the plurality of hardware components includes a power supply, and
   wherein one end of the middle portion defines a hollow region and includes a tension spring, the hollow region to receive the power supply and the tension spring for keeping the power supply located in the hollow region until removed by hand.

22. A computer chassis device configured for tool-free connection to and disconnection from a universal mounting bracket, comprising:
   a base having a plurality of protrusions snapably connectable to the mounting bracket;
   a midsection defining a space in the top thereof for reception of a hard drive, the midsection configured to contain a plurality of hardware components, at least one of which is snapably removable for easy repair, the midsection snapably removable from the base; and
   a cover snapably removable from the midsection, which when removed, supplies ready access to the hard drive,
   the computer chassis device further comprising a securement plate attached to the hard drive, the plate having a plurality of tension springs for snapable connection to the midsection.

23. The device of claim 22, further comprising a power supply cable, the cable being threaded from a power supply through the securement plate so as to cover the hard drive before connecting into a power connection.

24. A computer chassis assembly comprising:
   a base having a plurality of pins and at least one extending member having a lowest protrusion;
   a hard drive;
   a motherboard having a plurality of Network and USB ports;
   a power supply;
   a plurality of computer power and data cables;
   a midsection adapted to house computer hardware and defining a first large hollow space for reception of the hard drive and defining a second smaller hollow space for threading the power and data cables between the hard drive and the motherboard, the midsection having a plurality of tension springs for snapable connection to the base and snapable insertion of the power supply and the hard drive; and
   a cover having a plurality of tension springs for snapable connection to the midsection.

25. The assembly of claim 24, wherein the snapable connection of the hard drive includes a securement bracket having tension springs, the bracket configured to act as a heat sink.

26. The assembly of claim 24, further comprising an insertable gasket for covering the empty space defined between the plurality of Network ports, and wherein the midsection defines at least one groove for reception of the gasket.

27. The assembly of claim 26, wherein the base defines at least one groove, also for reception of the insertable gasket.

28. The assembly of claim 24, wherein the plurality of USB ports are recessed and oriented at an angle of generally about forty-five degrees, to prevent breakage of USB cable ends.

29. The assembly of claim 24, wherein one of the plurality of power cables is a power supply cable, the cable being threaded from the power supply through the midsection so as to cover the hard drive before connecting into the motherboard.

30. The assembly of claim 29, wherein the power supply cable connector passes through the midsection before connecting to the motherboard.

31. The assembly of claim 24, wherein the cover comprises inner side wings for guiding the cover to snap onto the midsection.

32. The assembly of claim 24, wherein the base comprises alignment grooves for guiding the extending member's lowest protrusion toward a central mounting aperture of a mounting bracket, the extending member for providing a stopping point for connection of the lowest protrusion and plurality of pins in the mounting bracket's apertures, whereby the assembled chassis is snapably secured onto the mounting bracket.

33. The assembly of claim 32, wherein the plurality of pins abut the motherboard to provide a ground connection to the mounting bracket.

34. The assembly of claim 33, wherein the plurality of pins include a plurality of springs placed thereon, whereby hard drive and motherboard vibrations are dampened.

* * * * *